(12) United States Patent
Bangalore

(10) Patent No.: US 11,138,391 B2
(45) Date of Patent: *Oct. 5, 2021

(54) AUTOMATIC TRANSLATION OF ADVERTISEMENTS

(71) Applicant: AT&T Intellectual Property II, L.P., Atlanta, GA (US)

(72) Inventor: Srinivas Bangalore, Morristown, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/430,845

(22) Filed: Jun. 4, 2019

(65) Prior Publication Data
US 2019/0286707 A1    Sep. 19, 2019

Related U.S. Application Data

(63) Continuation of application No. 15/424,967, filed on Feb. 6, 2017, now Pat. No. 10,318,643, which is a
(Continued)

(51) Int. Cl.
*G06F 17/15*    (2006.01)
*G06F 40/58*    (2020.01)
(Continued)

(52) U.S. Cl.
CPC ............ *G06F 40/58* (2020.01); *G06F 40/263* (2020.01); *G06F 40/40* (2020.01); *G06Q 30/02* (2013.01);
(Continued)

(58) Field of Classification Search
CPC .... G06F 17/289; G06F 17/28; G06F 17/2809; G06F 17/20; G06F 17/275;
(Continued)

(56) References Cited

U.S. PATENT DOCUMENTS 5,062,143 A * 10/1991 Schmitt ................. G06F 40/263
382/230
5,175,684 A    12/1992 Chong
(Continued)

FOREIGN PATENT DOCUMENTS

EP    0856980 B1    8/1998

OTHER PUBLICATIONS

A. Ranganathan et al., "Advertising in a Pervasive Computing Environment", In Proceedings of the $2^{nd}$ International Workshop on Mobile Commerce, 2000, Atlanta, GA, USA, Sep. 28, 2002.
(Continued)

*Primary Examiner* — Michael Ortiz-Sanchez
(74) *Attorney, Agent, or Firm* — Guntin & Gust, PLC; Atanu Das

(57) ABSTRACT

In an embodiment of a messaging system, a method for presenting a commercial message to a user is provided. A target language in which the user is comfortable communicating may be determined based on at least one communication received by the user or at least one communication provided by the user. The commercial message may be presented to the user in the target language.

20 Claims, 8 Drawing Sheets

Related U.S. Application Data continuation of application No. 14/564,671, filed on Dec. 9, 2014, now Pat. No. 9,563,624, which is a continuation of application No. 11/425,269, filed on Jun. 20, 2006, now Pat. No. 8,924,194.

(51) Int. Cl.
  *G06Q 30/02* (2012.01)
  *G06F 40/40* (2020.01)
  *G06F 40/263* (2020.01)
  *G10L 13/08* (2013.01)
  *G06F 40/00* (2020.01)

(52) U.S. Cl.
  CPC ..... *G06Q 30/0241* (2013.01); *G06Q 30/0271* (2013.01); *G10L 13/08* (2013.01); *G06F 40/00* (2020.01)

(58) Field of Classification Search
  CPC ............ G06F 17/2818; G06F 17/2827; G06F 17/2836; G06F 17/2872; G06F 17/2854; G06F 17/2881; G06F 17/2715; G06F 9/4448; G10L 13/08
  See application file for complete search history.

(56) References Cited

U.S. PATENT DOCUMENTS

| | | | |
|---|---|---|---|
| 5,627,549 A | 5/1997 | Park | |
| 5,768,603 A | 6/1998 | Brown et al. | |
| 5,809,242 A | 9/1998 | Shaw et al. | |
| 5,862,325 A | 1/1999 | Reed et al. | |
| 5,987,401 A | 11/1999 | Trudeau | |
| 6,061,646 A | 5/2000 | Martino et al. | |
| 6,167,369 A * | 12/2000 | Schulze | G06F 40/284 704/9 |
| 6,275,817 B1 | 8/2001 | Reed | |
| 6,349,290 B1 | 2/2002 | Horowitz et al. | |
| 6,757,646 B2 | 6/2004 | Marchisio | |
| 6,934,680 B2 | 8/2005 | Holzapfel | |
| 7,035,801 B2 | 4/2006 | Jimenez-Feltstrom | |
| 7,065,188 B1 | 6/2006 | Mei et al. | |
| 7,168,040 B2 | 1/2007 | Yamamoto | |
| 7,203,624 B2 | 4/2007 | Warshawsky | |
| 7,409,333 B2 | 8/2008 | Wilkinson et al. | |
| 7,548,846 B1 | 6/2009 | Monster | |
| 8,468,048 B2 | 6/2013 | Agarwal et al. | |
| 8,626,588 B2 | 1/2014 | Rajaram | |
| 2001/0027394 A1 | 10/2001 | Theimer | |
| 2001/0047261 A1 | 11/2001 | Kassan | |
| 2001/0047294 A1 | 11/2001 | Rothschild | |
| 2002/0010794 A1 | 1/2002 | Stanbach, Jr. et al. | |
| 2002/0016709 A1 | 2/2002 | Holzapfel | |
| 2002/0056086 A1 | 5/2002 | Yuen | |
| 2002/0111967 A1 | 8/2002 | Nagase | |
| 2002/0188670 A1 | 12/2002 | Stringham | |
| 2002/0194300 A1 | 12/2002 | Lin et al. | |
| 2003/0013438 A1 | 1/2003 | Darby | |
| 2003/0046075 A1 | 3/2003 | Stone | |
| 2003/0144912 A1 | 7/2003 | McGee | |
| 2003/0216922 A1 | 11/2003 | Gonzales et al. | |
| 2004/0059712 A1 | 3/2004 | Dean et al. | |
| 2004/0064322 A1 | 4/2004 | Georgiopoulos et al. | |
| 2004/0073608 A1 | 4/2004 | Bilchev | |
| 2004/0128144 A1 | 7/2004 | Johnson et al. | |
| 2004/0167784 A1 | 8/2004 | Travieso et al. | |
| 2004/0267612 A1 | 12/2004 | Veach | |
| 2005/0010419 A1 | 1/2005 | Pourhamid | |
| 2005/0162551 A1 | 7/2005 | Baker | |
| 2005/0171932 A1 | 8/2005 | Nandhra | |
| 2006/0031327 A1 | 2/2006 | Kredo | |
| 2006/0242013 A1 | 10/2006 | Agarwal | |
| 2006/0284981 A1 * | 12/2006 | Erol | G11B 27/034 348/207.1 |
| 2007/0121800 A1 | 5/2007 | Rodkey et al. | |
| 2007/0133756 A1 | 6/2007 | Graves et al. | |
| 2007/0156748 A1 * | 7/2007 | Emam | G06F 16/80 |
| 2007/0168450 A1 | 7/2007 | Prajapat | |
| 2007/0269775 A1 * | 11/2007 | Andreev | G09B 7/00 434/156 |
| 2007/0294080 A1 | 12/2007 | Bangalore | |
| 2008/0243472 A1 | 10/2008 | DeGroot | |
| 2008/0275785 A1 | 11/2008 | Altberg et al. | |
| 2009/0018816 A1 * | 1/2009 | Noldus | H04M 3/487 704/8 |
| 2009/0182549 A1 | 7/2009 | Anisimovich | |
| 2009/0313017 A1 | 12/2009 | Nakazawa | |
| 2011/0046940 A1 | 2/2011 | Tanaka | |

OTHER PUBLICATIONS

J. Borges and M. Levene, "Data Mining of User Navigation Patterns", In Proceedings of the WBBKDD'99 Workshop on Web Usage Analysis and User Profiling, Aug. 15, 1999, San Diego, CA, USA, pp. 31-36, 1999.

\* cited by examiner

AUTOMATIC TRANSLATION OF ADVERTISEMENTS

PRIORITY INFORMATION

The present application is a continuation of U.S. patent application Ser. No. 15/424,967, filed Feb. 6, 2017, which is a continuation of U.S. patent application Ser. No. 14/564,671, filed Dec. 9, 2014, now U.S. Pat. No. 9,563,624, issued Feb. 7, 2017, which is a continuation of U.S. patent application Ser. No. 11/425,269, filed Jun. 20, 2006, now U.S. Pat. No. 8,924,194, issued Dec. 30, 2014, the contents of which are incorporated herein by reference in their entirety.

BACKGROUND OF THE INVENTION

1. Field of the Invention

The present invention relates to automatic language translation of advertisements or commercial messages from a source language to a target language, and in particular to methods, systems, and machine-readable media for use in a messaging system for determining a target language in which a user is comfortable communicating and presenting a commercial message in the target language to the user.

2. Introduction

Advertisements are a huge revenue source for data network search companies and Internet service providers. Most data network search companies and Internet service providers are not sensitive to a user's native language and therefore, make no attempt to present advertisements or commercial messages to the user in a language in which the user is most comfortable.

Google of Mountain View, Calif., provides an email service which analyzes email in a user's inbox to determine which advertisements to target to the user. However, no attempt is made to translate the advertisements to a language that is most comfortable for the user

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for presenting a commercial message to a user is provided. A target language in which the user is comfortable communicating may be determined based on at least one communication received by the user or at least one communication provided by the user. The commercial message may be presented to the user in the target language.

In a second aspect of the invention, a machine-readable medium having stored thereon instructions for at least one processor may be provided. The machine-readable medium may include instructions for determining a target language in which the user is comfortable communicating based on at least one communication received by the user or at least one communication provided by the user via a communication system, and instructions for presenting a commercial message in the target language to the user.

In a third aspect of the invention, a communication system may be provided. The communication system may include a language selector to determine a target language in which the user is comfortable communicating based on at least one communication received by the user or at least one communication provided by the user, and a message presenter to present a commercial message in the target language to the user.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Exemplary Operating Environment

Figure 1:
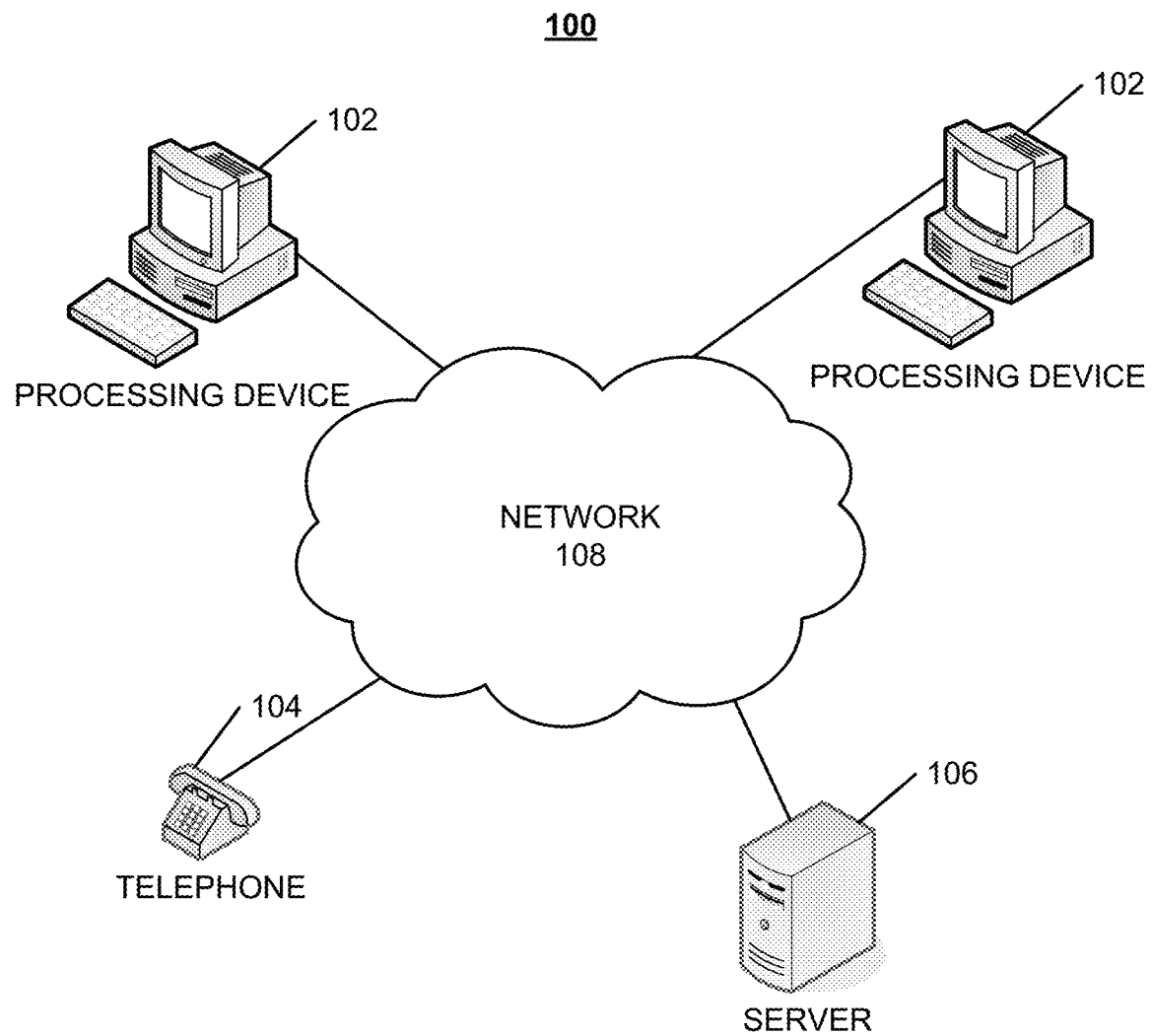
FIG. 1 illustrates an exemplary operating environment for a first embodiment of the invention.

FIG. 1 illustrates an exemplary operating environment 100 consistent with the principles of the invention. Operating environment 100 may include a number of processing devices 102, a telephone 104, a server 106 and a network 108. Although only two processing devices 102 are shown in FIG. 1, an operating environment 100 may include many more processing devices 112. Further, operating environment 100 may include 1 number of servers 106, instead of only one server 106, as shown in operating environment 100.

Each of processing devices 102 may be a device a user employs to access a communication system via a network and send and receive one or more communications to and from other users or a server, such as server 106. Telephone 104 may be, for example, a conventional telephone connected to a Public Switched Telephone Network (PSTN), or a wireless telephone, such as, for example, a cellular telephone or Personal Digital Assistant (PDA) with cellular telephonic capability connected to a mobile telephone network. Server 106 may be a server for providing communication services, such an email, instant messaging, voicemail, or other communication services or may be a server for providing services, such as search engine services.

Network 108 may be a wired or wireless network and may include a number of devices connected via wired or wireless means. Network 108 may include only one network or a number of different networks, some of which may be networks of different types. Network 108 may include, for example, a Local Area Network (LAN), a Wide Area Network (WAN), a packet switching network, an ATM network, a Frame Relay network, an Ethernet network, a fiber-optic network, a Public Switched Telephone Network (PSTN), a mobile telephone network, the Internet, or other types of network.

Figure 2:
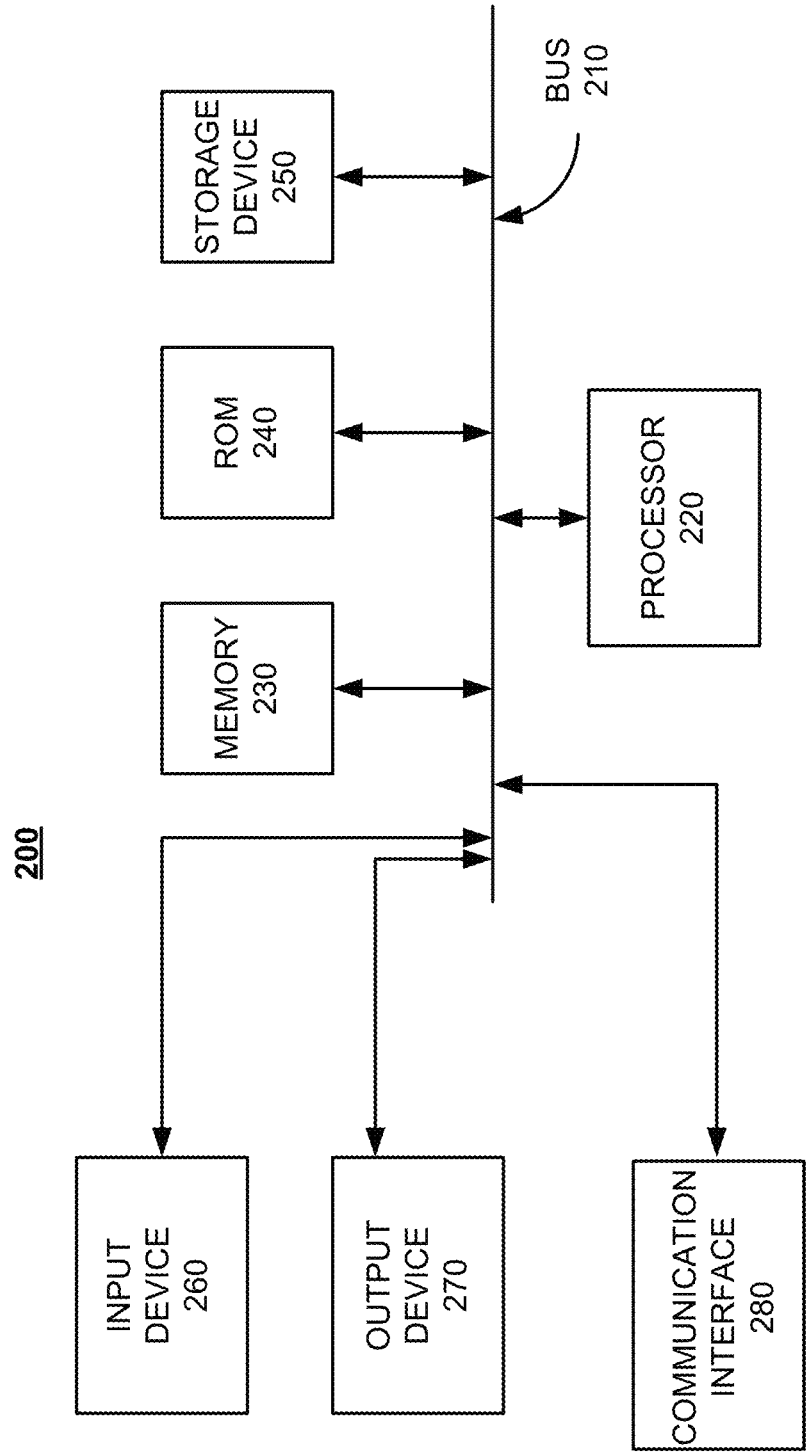
FIG. 2 is a functional block diagram of an exemplary processing system which may be used in implementations consistent with principles of the invention.

FIG. 2 illustrates an exemplary processing system 200 which may be used to implement processing devices 102, telephone 104 and/or server 106. Processing system 200 may include a bus 210, a processor 220, a memory 230, a read only memory (ROM) 240, a storage device 250, an input device 260, an output device 270, and a communication interface 280. Bus 210 may permit communication among the components of processing system 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, a voice recognition device, a microphone, a headset, etc. Output device 270 may include one or more conventional mechanisms that output information to the user, including a display, a printer, one or more speakers, a headset, an earphone, or a medium, such as a memory, or a magnetic or optical disk and a corresponding disk drive. Communication interface 280 may include any transceiver-like mechanism that enables processing device 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections.

Processing system 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Processing system 200 may be, for example, a personal computer (PC), a Personal Digital Assistant (PDA) or any other type of processing device. In alternative implementations, such as, for example, a distributed processing implementation, a group of processing devices 200 may communicate with one another via a network such that various processors may perform operations pertaining to different aspects of the particular implementation.

Exemplary Embodiments

Figure 3:
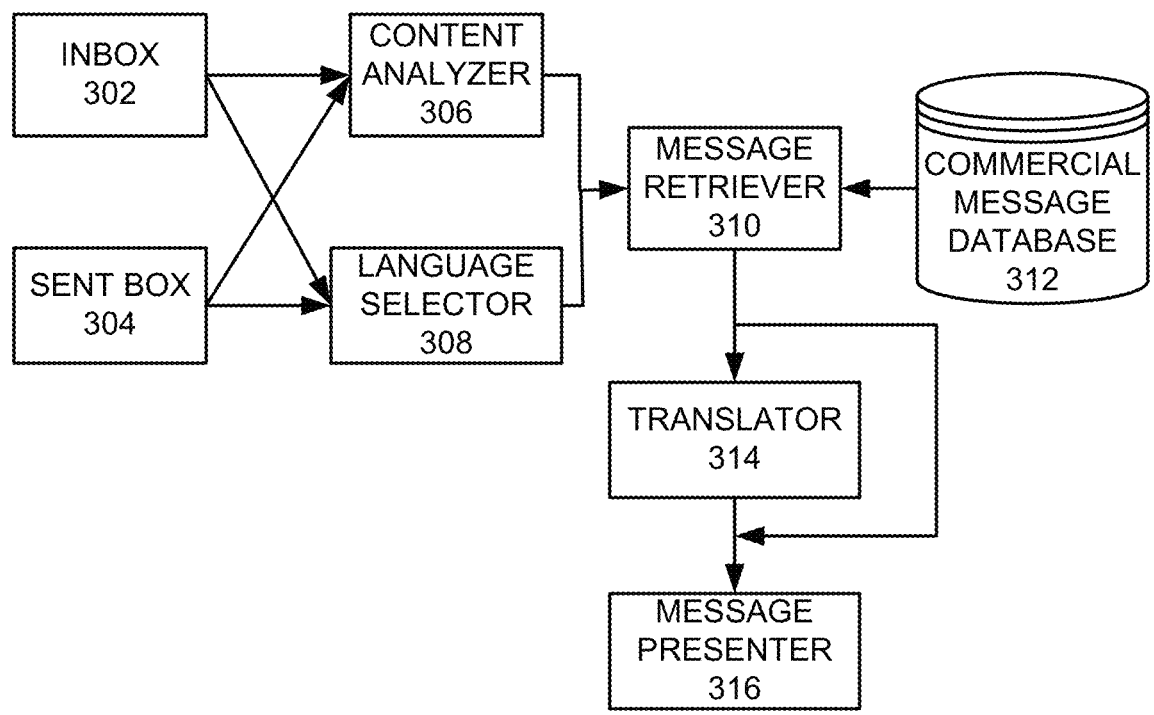
FIG. 3 is a functional block diagram of an exemplary server consistent with the principles of the invention.

FIG. 3 illustrates a functional block diagram of server 106 (FIG. 1). Server 106 may include an inbox 302, a sent box 304, a content analyzer 306, a language selector 308, a message retriever 310, a commercial message database 312, a translator 314, and a message presenter 316.

Inbox 302 and sent box 304 may be a user's exemplary communication folders, which may be stored on server 106. Inbox 302 and sent box 304 may be exemplary communication folders for holding received and sent communications, respectively. Other communication folders may also be stored on server 106, some of which may be communication folders created and named by a user.

Content Analyzer 306 may analyze words and distributions of words in user communication folders, such as, for example, inbox 302 and sent box 304, to determine one or more subjects that may be of interest to a user.

Language selector 308 may analyze words in user communication folders, such as inbox 302 an sent box 304, to determine a language of messages in the user communication folders and to select a language in which the user is comfortable conversing, such as, English, French, Spanish, or another language.

Message retriever 310 may retrieve one or more commercial messages from commercial message database 312, based on one or more subjects of interest to the user, as may be determined by content analyzer 306. Commercial message database 312 may be a database of commercial messages that may be indexed by subject matter and a language of each commercial message.

Translator 314 may translate a language from a source language to a target language. U.S. patent application Ser. No. 10/058,995, filed in the U.S. Patent and Trademark Office on Jan. 30, 2002, discloses a method, which may be used with implementations of the invention, for translating a source language to a target language. U.S. patent application Ser. No. 10/058,995 is incorporated by reference herein in its entirety.

Message presenter 316 may present one or more commercial messages to the user. Message presenter may include a speech generator to generate speech in a language in which the user is comfortable conversing. Other implementations of message presenter 316 may generate text in the language in which the user is comfortable conversing.

Exemplary Processing

Figure 4:
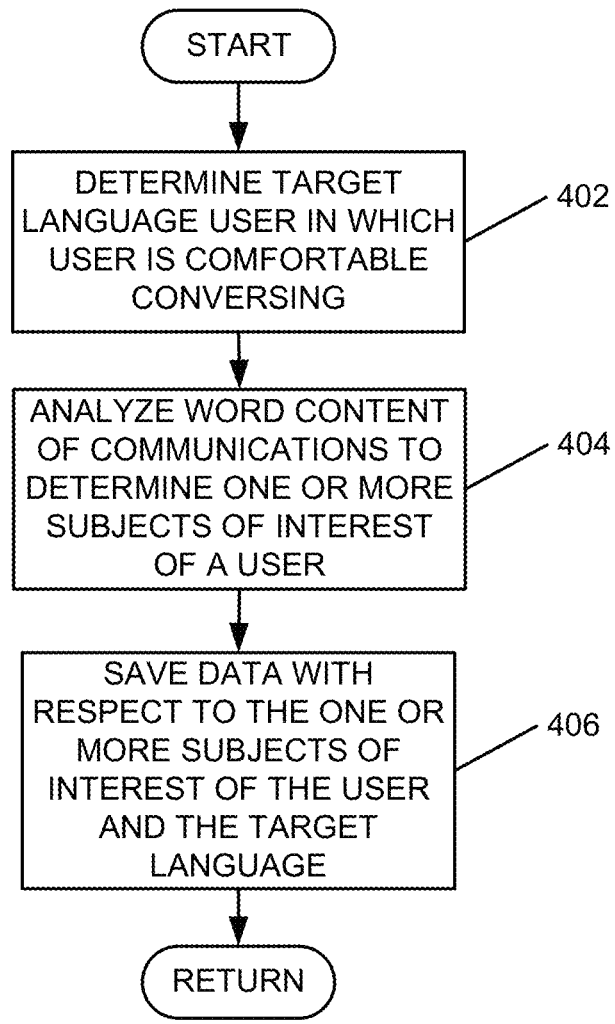
FIG. 4 is a flowchart of an exemplary process that may be performed in implementations consistent with the principles of the invention.

FIG. 4 illustrates exemplary processing which may be performed in implementations consistent with the principles of the invention. The processing may begin with language selector 306 of server 106 analyzing words in a user's communication folders, such as, for example, inbox 302, sent box 304, or other communication folders to determine a target language in which the user is comfortable conversing (act 402). Content analyzer 306 may then analyze a word content of the user's communications in the communication folders to determine one or more subjects of interest of the user (act 404). Data with respect to the user's one or more subjects of interest and the target language in which the user is comfortable conversing may be stored in storage on server 106 for later use (act 406). This process may be repeated periodically, such as, monthly, weekly, or some other time period.

Further, in other implementations, language selection and communication content analysis may be performed periodically, but statistics may be combined with statistics gathered during a previous X executions of acts 402 through 406. In such an implementation, for example, each subsequent execution may take into account previously calculated communication statistics with respect to language and content from the previous X periodic executions of acts 402 through 406. Of course, numerous other methods may be performed in other implementations consistent with the subject matter of this disclosure.

Figure 5:
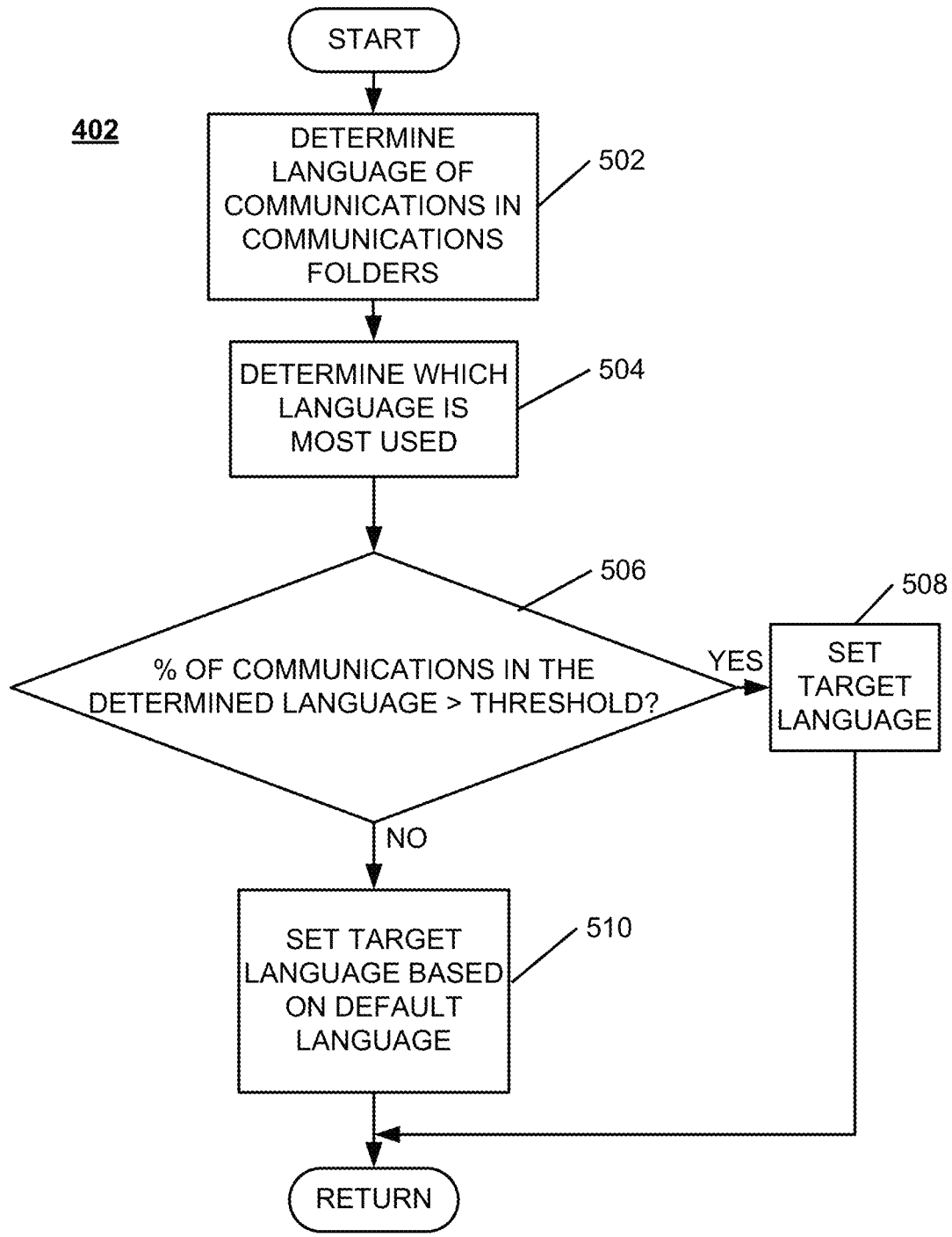
FIGS. 5 and 6 are flowcharts which provide more detail of certain aspects of the exemplary process illustrated by the flowchart of FIG. 4.

FIG. 5 is a flowchart which illustrates, in more detail, act 402 of the flowchart of FIG. 4. Language selector 308 of server 106 may determine a language of each message in communication folders, such as communication folder inbox 302, sent box 304, or other communication folders (act 502). Any well-known method may be used to determine a language of each communication in the message folders. Next, language selector 308 may determine which language is most used by the user (act 504). Language selector 108 may make this determination by counting a number of communications of each language in the user's communication folders and by calculating a percentage of total communications in the communication folders that are in each language. Language selector 308 may then select the language (for which translation capabilities exist) having a highest calculated percentage of communications and may determine whether the calculated percentage is greater than a threshold (act 506). If the calculated percentage is greater than a threshold, such as, for example, 50% or other value, then language selector 308 may set the target language to be the language having the highest calculated percentage (act 508).

If the calculated percentage of communications in the language is not greater than the threshold, then a default language may be selected, such as, for example, English, French or another language (act 510).

The above illustrated process is exemplary. Any one of a number of methods may be used to select a target language for a user in other implementations. For example, in one implementation, if no one language (for which translation capabilities exist) has a calculated percentage of communications that is greater than the threshold, then language selector 308 may set the target language to be any one of the languages (for which translation capabilities exist) used in communications in communication folders having a higher or equal percentage of communications than communications of other languages.

Figure 6:
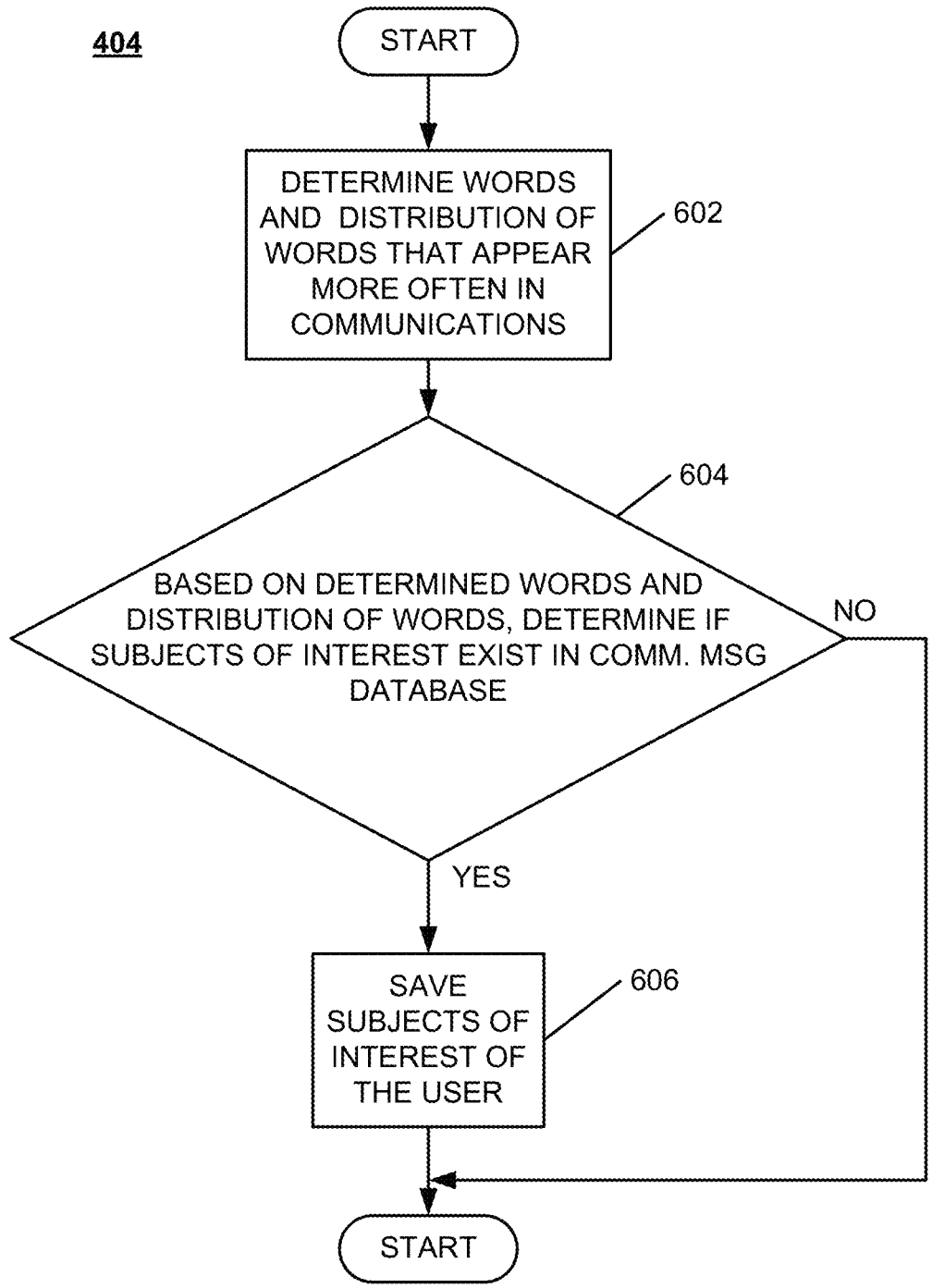

FIG. 6 is a flowchart which illustrates act 404 of the flowchart of FIG. 4 in more detail. First, content analyzer 306 of server 106 may look for keywords or phrases appearing in communications in the user's communication folders (act 602). If the keywords or phrases appear numerous times in communications in the communication folders, content analyzer 306 may compare the keywords or phrases to a subject matter index of commercial messages in commercial database 312 (act 604). One or more subject matters may be selected from the subject matter index based on matching keywords or phrases and may be saved (act 606).

Figure 7A:
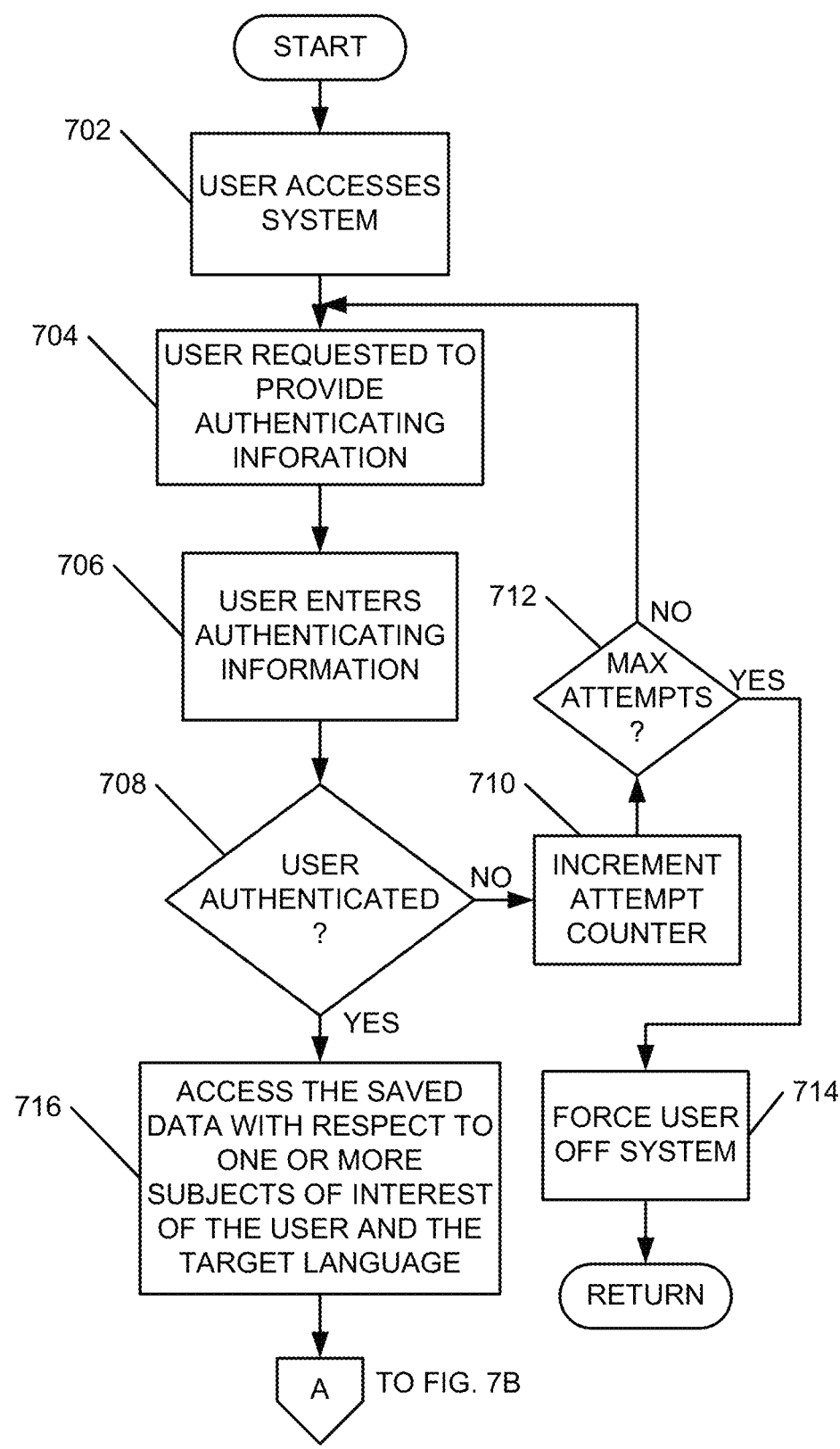
FIGS. 7A and 7B are flowcharts of an exemplary process that may be performed when a user uses an embodiment of the invention to access messages.
Figure 7B:
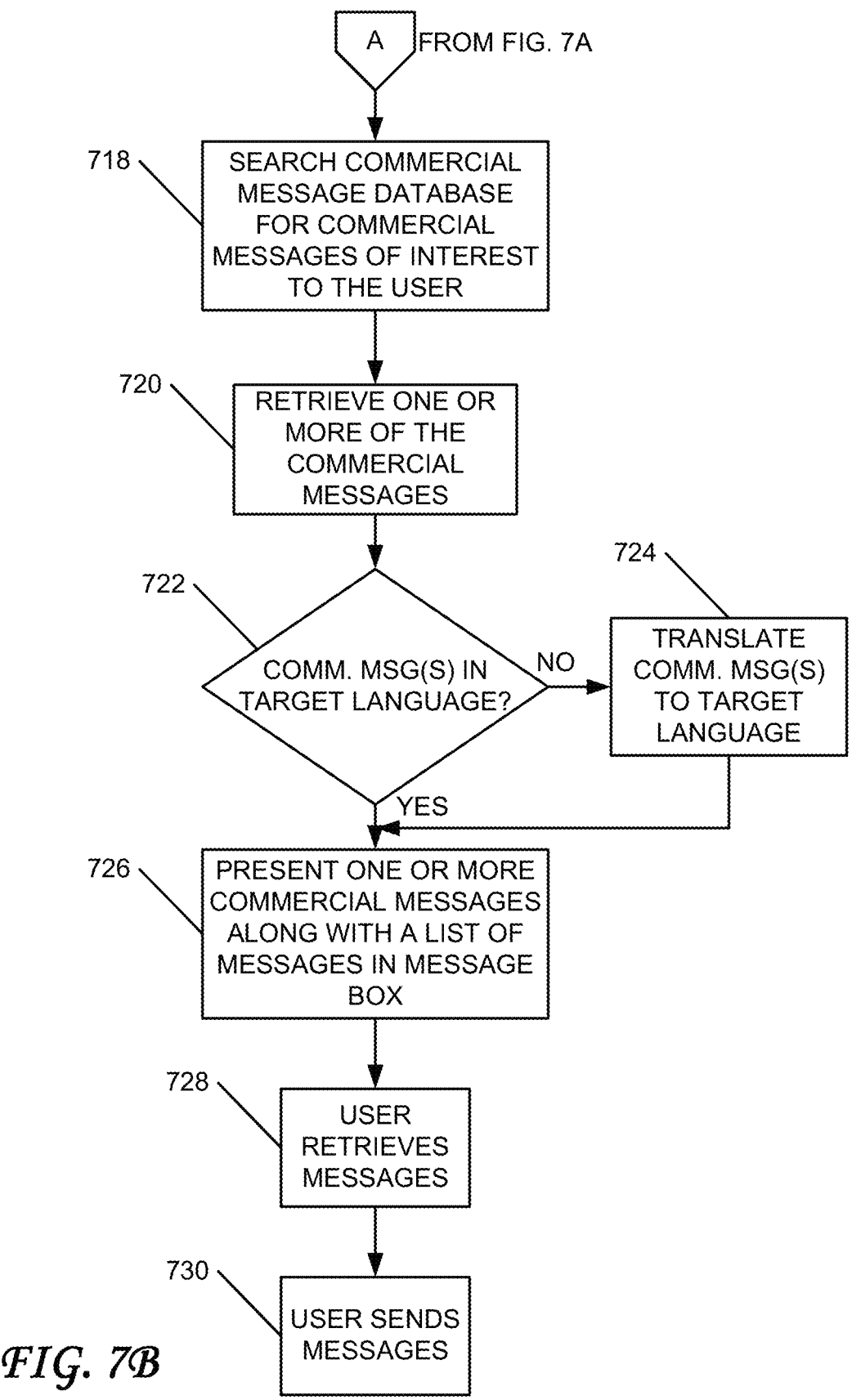

FIGS. 7A and 7B are flowcharts that illustrate an exemplary process in which a user may be presented with one or more commercial messages in a language whose use is comfortable for the user. The process may begin with a user at a processing device 102 or telephone 104 accessing a system, such as, for example, an e-mail system or other system on server 106 via a network, such as, for example, network 108 (act 702). Next, in some embodiments the user may be requested to provide authenticating information, such as, for example, a user ID and password (act 704). The user may enter the authenticating information via processing device 102 or telephone 104 (act 706). Server 106 may then determine whether the user is properly authenticated (act 708). If the user is not properly authenticated, then server 106 may increment an access attempt counter (act 710) and may determine whether a maximum number of attempts to be authenticated have been made by the user (act 712). If a maximum number of attempts to be authenticated have been made, then server 106 may force the user off the system (act 714). Otherwise, server 106 may again repeat acts 704 through 708 to provide the user with another opportunity to be properly authenticated.

Once the user is properly authenticated, message retriever 310 of server 106 may access the previously saved data regarding one or more subjects of interest of the user and a target language of the user (act 716). Message retriever 310 may then search commercial message database 312 for commercial messages of interest to the user (act 718; FIG. 7B). In some implementations, a subject matter index with respect to the commercial messages in commercial message database 312 may be accessed to find commercial messages related to the one or more subject matters of interest to the user. Assuming that commercial messages related to the one or more subject matters of interest exist, message retriever 310 may then retrieve one or more of the commercial messages related to the one or more subject matters of interest provided that either the one or more commercial messages are already in the target language or translator 314 is capable of translating the one or more commercial messages from a source language to the target language (act 720).

Next, translator 314 of server 106 may determine whether any of the one or more commercial messages are in the target language (act 722). Ones of the commercial messages that are not in the target language may be translated by translator 314 to the target language (act 724). Message presenter 316 may then prepare the one or more commercial messages for presentation to the user (act 726). For some users of processing device 102 and for users connected to the system through a device such as telephone 104, message presenter 316 may prepare the one or more commercial messages for verbal presentation. That is, message presenter 316 may perform speech generation in the target language to present the one or more commercial messages to the user. For other users, message presenter 316 may prepare a commercial textual message in the target language for presentation to the user. Such a textual message may be displayed on a portion of a display screen while the user reviews his or her messages.

Next, the user may be presented with received communications (act 728) and may send communications to (act 730).

CONCLUSION

The above-described embodiments are exemplary and are not limiting with respect to the scope of the invention. Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Further, in other implementations, hardwired logic may be used instead of processors, or one or more application specific integrated circuits (ASICs) may be used in implementations consistent with the principles of the invention. In addition, implementations consistent with the principles of the invention may have more or fewer acts than as described, or may implement acts in a different order than as shown. Accordingly, the appended claims and their legal equivalents should only define the invention, rather than any specific examples given.

I claim as my invention:

1. A method comprising:
    gathering, by a processing system including a processor and at a defined frequency defined by a respective periodic $N^{th}$ communication interaction of a plurality of communication interactions of a first user with a second user, data from a subset of communication interactions gathered from the plurality of communication interactions of the first user with the second user to yield statistical data;
    identifying, by the processing system, a group of languages utilized in the plurality of communication interactions;
    determining, by the processing system, a first language of the group of languages, wherein the first language is utilized above a threshold in the plurality of communication interactions;
    detecting, by the processing system, that there is no translation capability for the first language;
    determining, by the processing system, a second language of the group of languages, wherein the second language is utilized above the threshold in the plurality of communication interactions;
    detecting, by the processing system, that there is translation capability for the second language;
    identifying, by the processing system, based on the statistical data, no translation capability for the first language, and the translation capability of the second language, a target language of the first user, wherein the target language comprises the second language;
    receiving, by the processing system, a message in a source language which is distinct from the target language; and
    transmitting, by the processing system, a translated message, based on the source language of the message, in the target language to a device.

2. The method of claim 1, wherein the target language is a language having a number of words used in the subset of communication interactions above a word threshold.

3. The method of claim 1, wherein the statistical data further identify languages associated with the message.

4. The method of claim 1, further comprising:
    analyzing words in the plurality of communication interactions to determine a subject matter of interest to the first user; and
    determining whether to translate the message based on the subject matter of interest.

5. The method of claim 1, wherein the transmitting the translated message to the device further comprises:
    generating speech corresponding to the translated message; and
    transmitting the speech to the device as part of the transmitting of the translated message.

6. The method of claim 1, wherein the defined frequency further comprises a number of communication interactions with the first user over a specific period of time.

7. The method of claim 1, wherein the target language of the first user is determined based on words communicated by the first user.

8. The method of claim 1, wherein identifying the target language of the first user further comprises:
    determining a number of communications which exceed a percentage of communications associated with the first user in a particular language.

9. The method of claim 8, wherein the percentage of communications comprises the threshold, such that when the number of communications in the particular language is more than the threshold, the target language is identified as the particular language.

10. A system comprising:
    a processor; and a computer-readable storage medium having instructions stored which, when executed by the processor, cause the processor to perform operations comprising:

gathering, at a defined frequency defined by a respective periodic $N^{th}$ communication interaction of a plurality of communication interactions of a first user with a second user, data from a subset of communication interactions gathered from the plurality of communication interactions of the first user with the second user to yield statistical data;

identifying a group of languages in the plurality of communication interactions;

determining a first language of the group of languages, wherein the first language is utilized above a threshold in the plurality of communication interactions;

detecting that there is no translation capability for the first language;

determining a second language of the group of languages, wherein the second language is utilized above the threshold in the plurality of communication interactions;

detecting that there is a translation capability for the second language;

identifying, based on the statistical data, no translation capability for the first language, and the translation capability of the second language, a target language of the first user, wherein the target language comprises the second language;

receiving a message in a source language which is distinct from the target language; and transmitting a translated message, based on the source language of the message, in the target language to a device.

11. The system of claim 10, wherein the target language is a language having a number of words used in the subset of communication interactions above a word threshold.

12. The system of claim 10, wherein the statistical data further identify languages associated with the message.

13. The system of claim 10, wherein the computer-readable storage medium stores additional instructions stored which, when executed by the processor, cause the processor to perform operations further comprising:

analyzing words in the plurality of communication interactions to determine a subject matter of interest to the first user; and determining whether to translate the message based on the subject matter of interest.

14. The system of claim 10, wherein the transmitting the translated message to the device further comprises:

generating speech corresponding to the translated message; and transmitting the speech to the device as part of the transmitting of the translated message.

15. The system of claim 10, wherein the defined frequency further comprises a number of communication interactions with the first user over a specific period of time.

16. The system of claim 10, wherein the target language of the first user is determined based on words communicated by the first user.

17. The system of claim 10, wherein identifying the target language of the first user further comprises:

determining a number of communications which exceed a percentage of communications associated with the first user in a particular language.

18. The system of claim 17, wherein the percentage of communications comprises the threshold, such that when the number of communications in the particular language is more than the threshold, the target language is identified as the particular language.

19. A non-transitory computer-readable storage device having instructions stored which, when executed by a processor, cause the processor to perform operations comprising:

gathering, at a defined frequency defined by a respective periodic $N^{th}$ communication interaction of a plurality of communication interactions of a first user with a second user, data from a subset of communication interactions gathered from the plurality of communication interactions of the first user with the second user to yield statistical data;

identifying a group of languages utilized in the plurality of communication interactions;

determining a first language of the group of languages, wherein the first language is utilized above a threshold in the plurality of communication interactions;

detecting that there is no translation capability for the first language;

determining a second language of the group of languages, wherein the second language is utilized above the threshold in the plurality of communication interactions;

detecting that there is translation capability for the second language;

identifying, based on the statistical data, no translation capability for the first language, and the translation capability of the second language, a target language of the first user, wherein the target language comprises the second language;

receiving a message in a source language which is distinct from the target language; and transmitting a translated message, based on the source language of the message, in the target language to a device.

20. The non-transitory computer-readable storage device of claim 19, wherein the target language is a language having a number of words used in the subset of communication interactions above a word threshold.

* * * * *